United States Patent [19]

Rich et al.

[11] 3,961,564

[45] June 8, 1976

[54] FLUID MOTOR AND COMBINATION BUMPER AND SEALING RING THEREFOR

[75] Inventors: Beldon R. Rich, Des Plaines; Richard J. Gallagher, Glenview; John F. Berninger, Des Plaines, all of Ill.

[73] Assignee: Parker-Hannifin Corporation, Cleveland, Ohio

[22] Filed: May 14, 1974

[21] Appl. No.: 469,651

Related U.S. Application Data

[63] Continuation of Ser. No. 337,914, March 5, 1973, abandoned.

[52] U.S. Cl. ............................................. 92/85 R
[51] Int. Cl.² ......................................... F01B 11/02
[58] Field of Search ................... 92/85; 173/139; 227/130

[56] References Cited
UNITED STATES PATENTS

| | | | |
|---|---|---|---|
| 3,162,097 | 12/1964 | Allen et al. | 227/130 X |
| 3,194,324 | 7/1965 | Langas | 173/139 X |
| 3,266,581 | 8/1966 | Cooley et al. | 173/139 X |
| 3,320,860 | 5/1967 | Bade | 227/130 X |
| 3,387,541 | 6/1968 | Bade | 227/130 X |
| 3,392,632 | 7/1968 | Volkmann | 227/130 X |
| 3,427,928 | 2/1969 | Bade | 227/130 X |
| 3,494,530 | 2/1970 | Bade | 227/130 X |
| 3,496,840 | 2/1970 | Wandel et al. | 92/85 |

FOREIGN PATENTS OR APPLICATIONS

| | | | |
|---|---|---|---|
| 582,664 | 9/1958 | Italy | 92/244 |
| 602,412 | 2/1960 | Italy | 92/84 |

*Primary Examiner*—Martin P. Schwadron
*Assistant Examiner*—Abraham Hershkovitz
*Attorney, Agent, or Firm*—Donnelly, Maky, Renner & Otto

[57] ABSTRACT

A fluid motor and a combination bumper and sealing ring therefor in which the ring is of rubber-like material with a sealing portion to seal the joint between the cylinder and an end cap and with a bumper portion to cushion the piston at the end of its stroke. The sealing portion is axially spaced from portions of the end cap and there is a recess between the sealing portion and bumper portion to prevent the sealing portion from being deformed when the bumper portion is deformed by contact with the piston.

3 Claims, 3 Drawing Figures

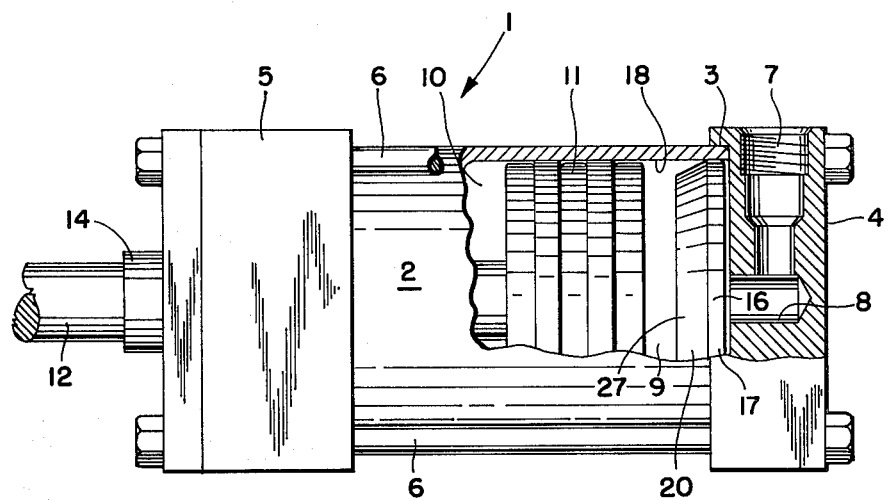
*Fig. 1*
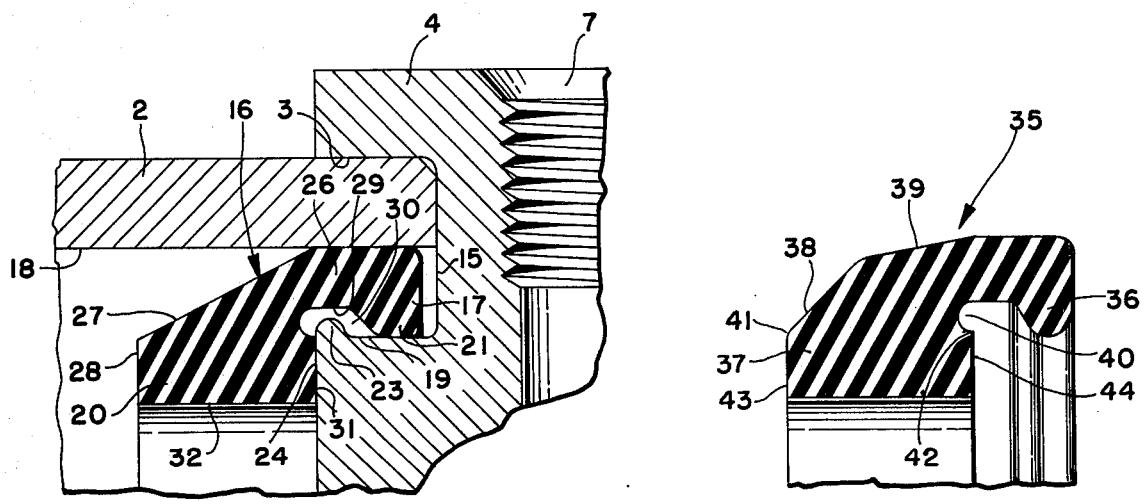
*Fig. 2*  *Fig. 3*

3,961,564

FLUID MOTOR AND COMBINATION BUMPER AND SEALING RING THEREFOR

This is a continuation of application Ser. No. 337,914, filed Mar. 5, 1973, now abandoned.

BACKGROUND OF THE INVENTION

It is well known to provide rubber-like bumper rings in cylinder type fluid motors for cushioning the piston at the end of its stroke and also for providing a seal for the joint between the cylinder and an end cap, one such arrangement being shown in U.S. Letters Patent 3,512,454. However, in such prior devices the sealing portion of the combination seal and bumper ring is not sufficiently isolated from the bumper portion to prevent undue stress and deformation from being transmitted to the sealing portion by the bumper portion when the latter is engaged by the piston.

SUMMARY OF THE INVENTION

The present invention relates to a sealing and cushioning arrangement for a cylinder type fluid motor in which a ring of rubber-like material has a sealing portion spaced from a relatively thick bumper portion and connected thereto by a thick connecting portion that defines a recess between the sealing and bumper portions. The sealing portion is at all times axially spaced from axially opposite portions of the end cap so that at no time will it be axially compressed or deformed which might otherwise interfere with the sealing function. Also, the sealing portion seals against axially overlapped portions of the cylinder and end cap and is retained upon the end cap by an external ridge of the latter that projects into the recess between the sealing and bumper portions of the ring. The recess also extends axially inward of the outer end of the bumper portion to assist in preventing deformation of the bumper portion from being transmitted to the sealing portion.

Another purpose of this invention is to provide noise reduction in pneumatic equipment. In certain applications where impact energy of moving parts of a fluid motor is low enough to preclude the use of cushions for example, such as shown in U.S. Pat. No. 3,056,385, bumpers as herein disclosed are sufficient to reduce the noise of such low impact. However, if the impact energy is high, cushions are employed to both absorb shock and reduce noise. Thus, bumpers become an economic choice over cushions where the application fits an inbetween state.

BRIEF DESCRIPTION OF THE DRAWING

FIG. 1 is a side elevation view, partly in cross-section of pneumatic cylinder embodying the combination seal and bumper ring hereof.

FIG. 2 is an enlarged fragmentary radial cross-section view showing one form of combination seal and bumper ring as installed in one end of the cylinder; and FIG. 3 is an enlarged fragmentary radial cross-section view of another embodiment of the combination seal and bumper ring.

DETAILED DESCRIPTION OF THE PREFERRED EMBODIMENTS

By way of illustrative example, the fluid motor 1 herein comprises a cylinder 2 having its ends fitting into annular grooves 3 in the respective end caps 4 and 5, said cylinder 2 being clamped between said end caps 4 and 5 by means of the tie bolts 6. Each end cap 4 and 5 has a threaded port 7 and a passage 8 leading to the respective chambers 9 and 10 on opposite sides of the piston 11 which is reciprocable in the cylinder member 2, said piston 11 having a piston rod 12 extending through a suitable packing gland 14 associated with the end cap 5. Disposed between the end of the cylinder 2 and the end cap 4 (and if desired also between the other end cap 5 and the adjacent end of the cylinder 2) is a combination seal and bumper ring 16 of deformable or rubber-like material which has a sealing portion 17 axially spaced from radial face 15 of end cap 4 and making fluid tight sealing engagement with the cylinder bore 18 and an axial wall 19 of the end cap 4, and a bumper portion 20 which projects axially inwardly from the end cap 4 so as to be engageable by the end of the piston 11 as the latter approaches the end of its stroke.

As shown in FIGS. 1 and 2, the axially inner end of end cap 4 is formed with an annular groove 3 the outer diameter of which receives the outer surface of the cylinder 2 with a close fit and the inner wall 19 of which is radially spaced inward from cylinder bore 18 to provide an annular space in which sealing portion 17 is radially squeezed to establish a fluid tight sealing contact with cylinder bore 18 and end cap wall 19. Sealing portion 17 has a radially inturned bead 21 rounded on its radially inner face and which, in its relaxed condition, has an inside diameter smaller than the diameter of the inner wall 19 so that when ring 16 is installed on end cap 4 sealing portion 17 is circumferentially stretched, the amount of circumferential stretch preferably being of magnitude approximately equal to the stretch employed in conventional O-ring design. When so stretched, the radially outer surface of sealing portion 17 is greater in diameter than bore 18 whereby, when the end cap 4 is positioned as shown in FIG. 2, the sealing portion 17 will be subjected to radial squeeze between the bore 18 and inner wall 19. Inwardly of wall 19, end cap 4 has a radially outwardly extending ridge 23 which radially overlaps bead 21 of the sealing portion 17 and hence ring 16 is retained against axial dislodgment from end cap 4.

The bumper portion 20 of ring 16 comprises a relatively thick annular body which axially overlies the inner end surface 24 of end cap 4 and which is integrally joined to the sealing portion 17 by a relatively thin connecting portion 26 whose radially inner surface 29 defines a recess 30 adjacent bead 21 and which has a radial clearance with ridge 23. Recess 30 also extends axially inwardly of outer end face 31 of bumper portion 20. As shown in FIG. 2 bumper portion 20 has an exterior tapered face 27 and terminates in an end face 28 adapted to be engaged by the plane end face of the piston 11 as the piston 11 moves toward the right as viewed in FIGS. 1 and 2. End face 28 is preferably flat as shown, but may be rounded for some applications. When bumper face 31 is in engagement with end cap face 24, sealing portion 17 is axially spaced from both ridge 23 and surface 15.

Ring 16 is preferably made of rubber-like material and when piston 11 engages the bumper portion 20, the latter is compressed and deformed between the piston and end cap surface 24 to cushion the stopping of the piston. At this time there may be slight axial movement imparted to sealing portion 17 by the thin connecting portion 26 but sealing portion 17 remains out of contact with both ridge 23 and end cap wall surface 15 whereby there is substantially no axial deformation of sealing portion 17. Because the inner end 31 of the bumper 20 is in initial contact with surface 24 of the end cap 4, there will be an immediate marked increase in resistance to continued movement of the piston 11 toward the right accompanied by outward bulging of the tapered exterior 27 and also inward bulging at its inside diameter 32. At this stage, the piston 11 movement is arrested so that the bumper portion 20 will, in effect, constitute substantially a positive stop, but from the time that the piston 11 initially contacts the bumper portion 20 until such substantially positive stop position is reached, the bumper portion 20 offers progressive increases in resistance to piston 11 movement thus to halt the piston 11 movement within a very short axial distance after initial engagement of the piston 11 with the bumper portion 20.

The combination seal and bumper 35 shown in FIG. 3 has a sealing portion 36 substantially the same as the sealing portion 17 in FIGS. 1 and 2, but the bumper portion 37 has been modified to provide a double taper portion 38–39. Taper 39, which is about 10° to 15°, permits the ring, when in place on end cap 4, to be easily assembled with cylinder bore 18 even though such insertion causes radial compression of sealing portion 36. Taper 38 which is about 45°, provides substantial and progressive clearance with bore 18 and also is so formed that the corner 41 of its intersection with inner end face 43 is in approximate axial alignment with corner 42 which defines the outer diameter of transverse surface 44. Because surfaces 43 and 44 are substantially axially opposite each other the bumper portion will be substantially entirely under direct axial compression with little or no destructive bending stresses imparted thereto.

We claim:
1. In combination, a fluid motor having a cylinder defining a bore and including an end cap at one end; said end cap having an end portion which extends axially into said cylinder bore from said one end thereof; said end portion having an inner wall extending axially inwardly from said one end and radially spaced with respect to said cylinder bore; an inner end surface extending in the radial direction at the axially innermost end of said inner wall and projecting radially outwardly beyond said inner wall, said inner end surface being radially spaced with respect to said cylinder bore; an outer end surface extending radially from said inner wall to said cylinder bore; a piston reciprocable in said cylinder; and a one-piece combination seal and bumper ring of resiliently deformable material having a sealing portion radially squeezed between said bore and said inner wall into sealing engagement therewith and having a bumper portion extending radially inwardly with respect to said cylinder bore and axially inwardly with respect to said inner and surface; said bumper portion having annular end walls respectively in juxtaposition to said inner end surface and engageable by said piston to apply axial compressive force on said bumper portion to deform the latter thus to cushion the end portion of the piston stroke; said sealing portion having axial clearances with said outer end surface and the radially outer portion of the end wall of said bumper portion which is in juxtaposition to said inner end surface having axial clearances with the radially outer portion of said inner end surface and defining an annular groove in said bumper portion extending axially inwardly from said inner end surface for axial sliding movement of said sealing portion during deformation of said bumper portion between said piston and said inner end surface.

2. The combination of claim 1 wherein the exterior surface of said ring has a bore-engaging portion extending to about the plane of said inner end surface from which it tapers to the axially inner end wall of said bumper portion whereby said bumper portion is subjected to substantially direct axial compressive force when engaged by said piston and whereby said bumper portion is of increasing radial cross-section area toward said inner end surface of said cap.

3. The combination of claim 1 wherein said groove has an axially extending portion which is radially spaced around the inner end surface to define a radially thinner connecting portion which integrally connects together said sealing and bumper portions and through which axial sliding movement is transmitted to said sealing portion upon deformation of said bumper portion.

* * * * *